June 2, 1964  F. KEPKA ETAL  3,135,287
VALVE
Filed March 7, 1962  3 Sheets-Sheet 1
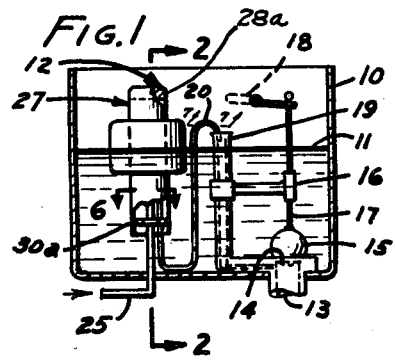
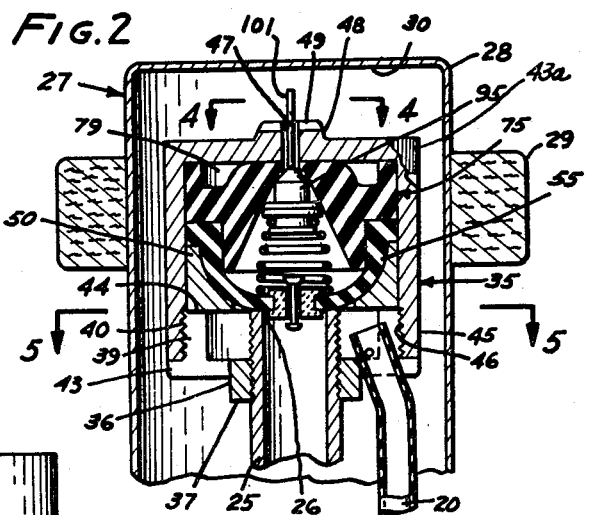
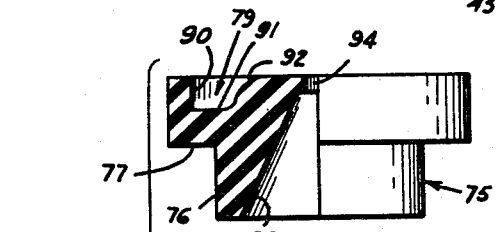
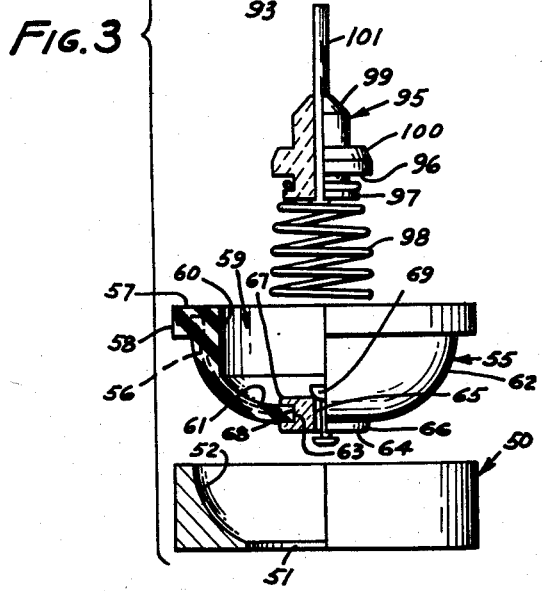
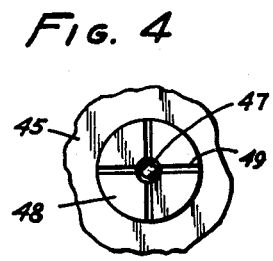
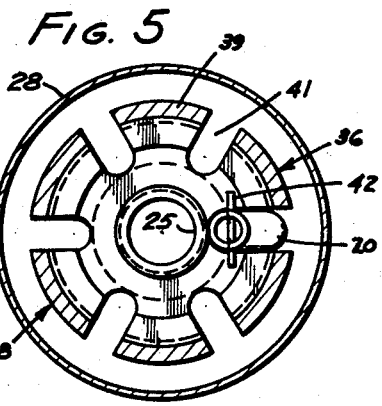
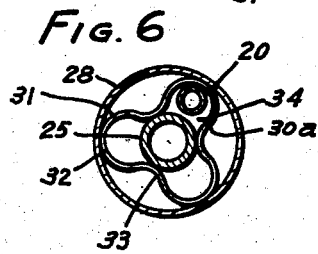
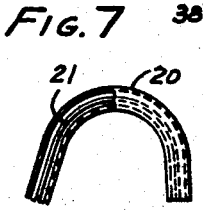
INVENTORS
FRANK KEPKA
WILLIAM T. HEYER
BY
ATTORNEYS.

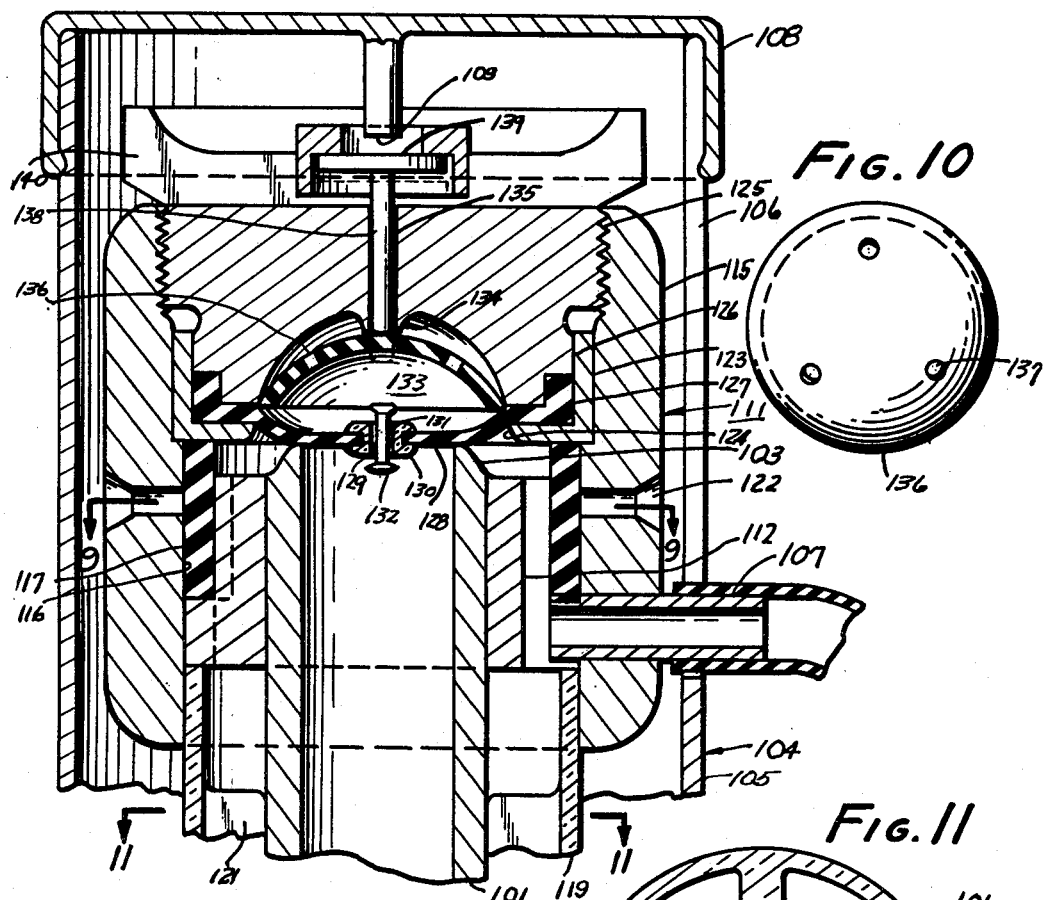
Fig. 8
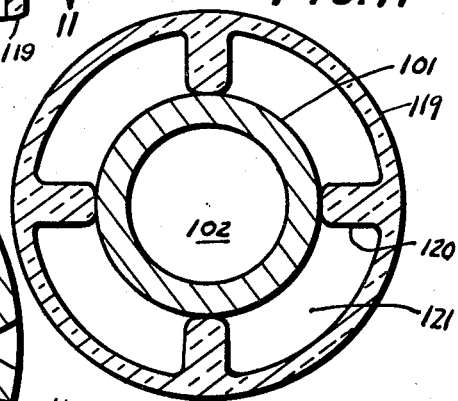
Fig. 10
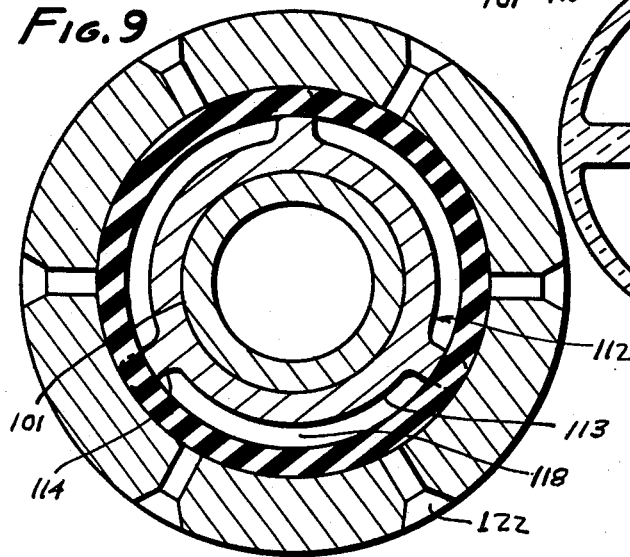
Fig. 9
Fig. 11
INVENTOR.
FRANK KEPKA
WILLIAM T. HEYER
BY
Angus & Mow
ATTORNEYS.

June 2, 1964   F. KEPKA ETAL   3,135,287
VALVE
Filed March 7, 1962   3 Sheets-Sheet 3
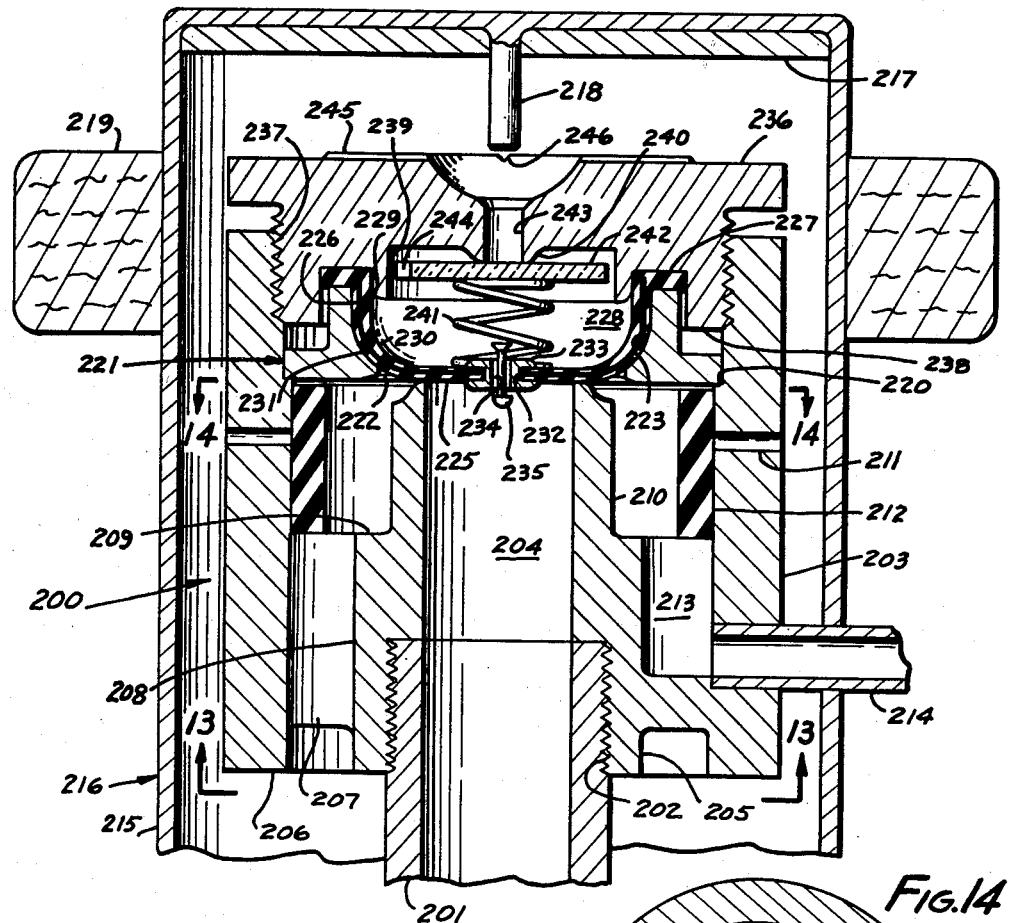
FIG.12
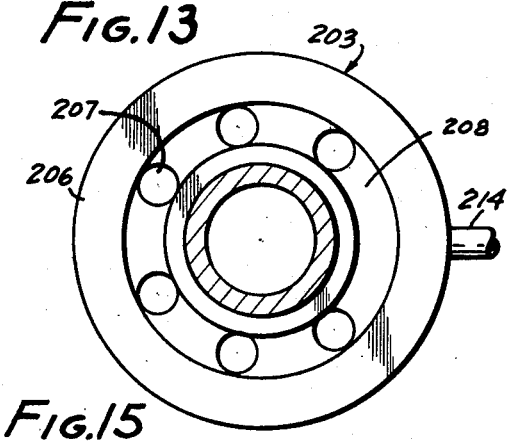
FIG.13   FIG.14
FIG.15
INVENTOR.
FRANK KEPKA
WILLIAM T. HEYER
BY
ATTORNEYS.

United States Patent Office 3,135,287
Patented June 2, 1964

3,135,287
VALVE
Frank Kepka, 2995 N. Lake Ave., Altadena, Calif., and William T. Heyer, 41 N. Wilson Ave., Pasadena, Calif.
Filed Mar. 7, 1962, Ser. No. 178,169
10 Claims. (Cl. 137—414)

This invention relates to a valve that is particularly suited for maintaining a water level in tanks such as toilet tanks.

This is a continuation-in-part of applicant's co-pending patent application, Serial No. 103,680, filed April 11, 1961, which in turn is a continuation-in-part of application, Serial No. 829,334, filed July 24, 1959. Both of said prior applications are now abandoned.

An object of this invention is to provide a rugged and simple toilet valve having a control element which requires only a short distance of movement in order to open or shut the valve, and which has simple moving parts that are substantially wear-free.

A valve according to this invention is used in combination with a tank in which water is to be maintained at a given level by the valve. The valve includes a float-actuated trip member that rises and falls with the level of the water in the tank. This trip member has a contacting surface which actuates a valving member.

The valve has an inlet and an outlet, and the valving member includes a diaphragm that is so disposed and arranged that it can close the inlet in one of its positions, and can allow fluid to flow from inlet to outlet in another of its positions. A closure member together with the diaphragm forms a cavity, there being a port through the diaphragm interconnecting the inlet and the cavity, and a drain port through the closure member interconnecting the cavity with atmospheric pressure and adapted to be closed by a valving member. The valving member may be a poppet or a diaphragm, or a disc member. Means is provided for moving the valving member to open the drain port by contact with the contacting surface. Pressure in this cavity can rise to inlet pressure if the drain port is closed, or can be lowered close to atmospheric pressure if the drain port is opened, both conditions being governed by actuation of the valving member by the trip member.

An optional feature of this invention resides in a cushioning cavity in the closure member which is enclosed by structure that houses the valving member, the closure member being made of flexible material so that there is provision for flexure of the closure member to take up shock created by sudden closure of the valve.

Still another optional feature of the invention resides in forming the valving member as a diaphragm having perforations laterally spaced from the drain port, and a central imperforate portion adjacent the drain port so that the diaphragm can selectively close the drain port or open it to expose the cavity to atmospheric pressure, the perforations acting as passages for the purpose.

Yet another optional feature of the invention resides in the provision in the cavity of a boss surrounding the drain port, and a valving member in the form of a disc adapted to close the drain port when it seats upon the boss, the trip member being adapted to move the disc off the boss. Notches may be provided in the disc edge to assure fluid flow to the drain port when the drain port is open.

Still another optional feature of the invention resides in a vacuum breaker comprising a flexible cylinder the inside of which forms part of the outlet wall, and perforations through the valve interconnecting the outside of the flexible cylinder with the atmosphere, whereby, if a negative pressure develops in the outlet, the flexible cylinder collapses to admit air which thereby breaks the suction.

The above and other features of this invention will be fully understood from the following detailed description and the accompanying drawings, in which:

FIG. 1 is a side elevation, partly in cutaway cross-section, showing a toilet valve installation which includes a valve according to this invention;

FIG. 2 is a fragmentary cross-section taken at line 2—2 of FIG. 1;

FIG. 3 is an exploded view of a portion of the valving member of the invention;

FIG. 4 is a top view taken at line 4—4 of FIG. 2;

FIG. 5 is a cross-section taken at line 5—5 of FIG. 2;

FIGS. 6 and 7 are cross-sections taken at lines 6—6 and 7—7, respectively, of FIG. 1;

FIG. 8 is a cross-section of another embodiment of the invention;

FIG. 9 is a cross-section taken at line 9—9 of FIG. 8;

FIG. 10 is a top view of a part of FIG. 8;

FIG. 11 is a cross-section taken at line 11—11 of FIG. 8;

FIG. 12 is a cross-section of the presently preferred embodiment of the invention;

FIGS. 13 and 14 are cross-sections taken at lines 13—13 and 14—14, respectively, in FIG. 12; and FIG. 15 is a plan view of a part of FIG. 12.

In FIG. 1, a tank 10 is shown in which water is stored for a flushing cycle. The water level 11 shown is that which is sought to be maintained by a control valve 12. The tank is provided with an outlet 13 fitted with a ball seat 14 and a ball 15 for shutting off flow at the seat.

A vertically disposed stem guide 16 maintains a stem 17 vertically so that lifting stem 17 by turning handle 18 raises the ball off the seat and allows water to run from the tank to a toilet. When the ball drops back to the seat, the outlet is closed and water from the control valve refills the tank.

An overflow pipe 19 taps into outlet 13 below the ball seat, and a bowl-fill tube 20 leads from the control valve to the overflow pipe so as to place a small supply of water in the toilet bowl by the end of a flushing cycle in readiness for use on the next cycle. The tube has a short length of wire 21 (FIG. 7) in its end which is bent to hold the end of the tube in the shape of a hook so that the end of the tube can simply be hung over the upper end of the overflow pipe.

An inlet pipe 25 enters the tank from the bottom thereof and stands vertically inside the tank. The inlet pipe has at its upper end an inlet port 26 (FIG. 2), at which port water under system pressure is maintained in readiness to pass through the control valve to refill the tank.

A trip member 27 comprises a tube 28 with a cap closing its top. The tube carries a lead weight 28a for ballast. The inner surface of the cap has a horizontal contact surface 30 to actuate certain parts of the control valve.

To the outside surface of tube 28 there is frictionally engaged a ring-shaped buoyant float 29. Particularly useful substances for the float are porous plastic substances, such as styrofoam and the like, which are buoyant, and which do not become saturated with water. The float may be slid up and down the tube to select the water level to be maintained by the valve.

A tube guide 30a is attached to the inlet pipe a few inches from its upper end. The guide is best shown in FIG. 6. It is a piece of bent metal strip having three arms 31 with arcuate outer walls 32 and inner pipe embracing walls 33. At least one of the arms has an opening 34 through which the bowl-fill tube passes. The guide serves to laterally stabilize tube 28, and to keep a medial part of tube 20 from whipping around excessively.

Within tube 28 and threaded onto the upper end of inlet pipe 25, there is a valving member 35. This member is mounted to the inlet pipe by means of adapter 36, which is defined as a part of member 35. Adapter 36 has an internally threaded central tube 37 which is threaded onto the upper end of the inlet pipe. The adapter has a six-armed flange 38 (FIG. 5), each of the flanges having a rising arcuate shoulder 39 with exterior threads 40 thereon. The adapter is conveniently formed from mill-drawn fluted stock, the flutes in the stock forming slots 41 in the flanges. The slots provide communication between the inside of the shoulders and the bottom of the flange.

A piece of wire 42 extends through and projects from both sides of bowl-fill tube 20 near one end thereof. Tube 20 is passed through one of the slots, with the wire engaging the inner surfaces of a pair of adjacent shoulders, the upper end of the tube thereby being retained above the flange and adjacent to the inlet port. The adapter has an outer rib 43 on each of its arms. The upper ends of the shoulders terminate in flat surfaces 44.

A cap 45 has interior threads 46 which are threaded down onto the adapter so that the open end of the cap abuts ribs 43. Exterior knurls 43a are provided as an assistance in tightening down the cap, which can be accomplished by hand. The top of the cap has an upper drain port 47 therethrough which passes through the middle of a boss 48. A pair of cross-cut slots 49 are milled into the upper surface of the boss and make fluid communication between the outside of the boss, and drain port 47. When contact surface 30 is in contact with the top of the boss, fluid flow through drain port 47 is still possible through slots 49.

Within the cap and resting on surface 44 of the adapter there is a seat 50 which has a central port 51. This port may be considered the valve outlet. Above port 51 is a spheroidal retainer seat 52. Seat 50 rests against upper surface 44, and stands between the adapter and the outer edge of a diaphragm 55. The diaphragm has a reinforcement sheet 56 of cotton cloth embedded between layers of neoprene rubber 57. The diaphragm has an outer shoulder 58, and a central cavity 59 that has an upper substantially cylindrical interior wall 60 which blends into a lower substantially spheroidal wall 61 when the diaphragm is in its unflexed condition, as shown in FIG. 2. The outer lower surface 62 of the diaphragm is also spheroidal.

A hole 63 at the center of the diaphragm receives a nylon insert 64 with a port 65 therethrough. Because the diaphragm flexes upwardly from the position shown in FIG. 2, it has been found desirable to put in solid structure such as this insert surrounding the port to assure that the port does not shut when the diaphragm moves up. The insert has a pair of spaced shoulders 66, 67 that form an exterior groove 68. The edge of hole 63 fits in this groove.

A scouring pin 69 is loosely fitted in port 65. The scouring pin has a lesser area than the port so that the port remains open. The pin is headed on both ends so it will not fall out. Port 65 places the upper side of the diaphragm in fluid communication with fluid pressure in the inlet pipe.

The valving member includes a closure member 75 which stands between the cap and the diaphragm. It has an outer cylindrical wall 76 which enters into and engages cylindrical wall 60 of the diaphragm. There is also an annular surface 77 which engages the upper face of shoulder 58. Tightening the cap on the adapter compresses the closure member, diaphragm, and seat together and holds the valving member assembled.

The upper surface of the closure member has a circular groove 79. The groove is bounded by an outer cylindrical wall 90, a flat bottom 91, and a central dome 92. This groove is closed off by the lower surface of the cap to form a cavity. This provides for some flexibility in the valving member for cushioning shock which sometimes occurs when the valve is closed.

As another expedient for reducing shock upon closure of the valve, a cavity 93 is formed in the bottom surface of the closure member with a frusto-conical shape. It has been found that a cavity of this shape and at this location results in a quieter and less violently active valve than if this cavity were not provided.

At the upper end of cavity 93 there is a drain port 94 aligned with drain port 47, so that the two drain ports form a single conduit. A poppet 95 is placed inside the cavity. A pair of spring-retaining shoulders 96, 97 are provided on the poppet to form a groove in which the upper end of a bias spring 98 can be attached and retained. The bias spring is placed in compressive opposition between the poppet and the central portion of the diaphragm. The poppet includes a seal 99 and a guide shoulder 100 axially spaced from the seal.

A control pin 101 on the end of the poppet passes through drain ports 47 and 94 and projects above the cap. Pin 101 has a smaller area than either of the drain ports so that water can flow through the drain ports past the pin when the support does not close them.

FIGS. 8–11 show another embodiment of the invention in which the device is attached to an inlet pipe 101, the inlet pipe having a central passage 102 for entry of pressure water. The upper end of the inlet pipe has a crowned seat 103.

A trip member 104 includes a tubular portion 105 which surrounds the valve and the inlet pipe. It has an axial slot 106 through its side to pass an overflow tube 107, and a cap 108 to close the top of the tubular portion. Slot 106 vents the upper inside end of the trip member. The cap includes a contact surface 109 in the form of a downwardly depending boss. The cap is adapted to snap over the end of the tubular portion. A float (not shown) will surround and make frictional fit with the outside of the tubular portion for raising and lowering the trip member as a function of water level in the tank, the same as in FIGS. 1–7.

Valve 111 includes an adapter 112 with a central portion 113 which may be frictionally fitted or cemented to the upper end of the inlet pipe. It may also be threadedly attached thereto. The central portion includes three fins 114 which are attached to a sidewall portion 115. In fact, the central portion and sidewall portion may be cast integrally out of plastic, if desired.

A vacuum breaker groove 116 is provided in the inner wall of the sidewall portion within which a vacuum breaker ring 117 of flexible rubber-like material is fitted, still leaving room for three outlet passages 118, which outlet passages communicate with a spill tube 119 which surround the inlet tube. As can best be seen in FIG. 11, spill tube 119 has four fins 120 which contact the inlet tube so as to leave spill passages 121 therebetween, through which the water can discharge to the tank. The sidewall has formed through it, vacuum breaker passages 122 whose outer ends are vented to the region between spill tube 119 and tubular portion 105. The inner end terminates adjacent to the vacuum breaker ring so that low pressure inside of the vacuum breaker ring will cause the rings to spring away from the inside wall of the sidewall portion and break the vacuum. The vacuum breaker ring is loosely seated so that it can freely leave the side and vent the inside of the sidewall portion.

Immediately above the vacuum breaker ring there is a seat member 123 having a central port 124 which may be considered the valve outlet. A cap 125 is threaded into the upper end of the adapter and has a neck portion 126 which fits inside the seat member and bears against a flange 127 on a shut-off diaphragm 128 to clamp the outer edge of the diaphragm between the cap and the seat member. The diaphragm includes a central portion having a hole 129 with an insert 130 having a port 131 and a scouring pin 132 therein. The scouring pin is smaller in diameter than the port, and serves only to keep the port free of foreign material. The shut-off diaphragm extends across the outlet port, and when in the position shown in FIG. 8, bears against the upper end of the inlet pipe to shut the valve off. The shut-off diaphragm defines with cap 125 a cavity 133. The upper surface of the cavity has a boss 134 through which there passes a drain port 135. The drain port is adapted to be closed or opened by a control diaphragm 136 which is imperforate at its central portion and has several perforations 137 axially spaced therefrom. A control pin 138, whose diameter is less than the diameter of drain port 135, passes through the drain port and has a head 139 at its upper end. As can be seen from FIG. 8, the control pin may be pressed downwardly by the cap on the trip member to push the imperforate portion of the control diaphragm away from the drain port, thereby opening the cavity below diaphragm 136 to atmospheric pressure through the perforations. When the control pin is up in the position shown in FIG. 8, the imperforate portion of the control diaphragm closes the drain port as shown, and the cavity below the perforation is isolated from the atmospheric pressure at drain port 135. The control diaphragm is molded in the crown position shown, and the control pin is very light; therefore, the natural springiness of the control diaphragm is enough to push the control pin upward. Transverse slot 140 is milled across the head of cap 125 so as to always vent the upper end of the drain port to the pressure contained inside the trip member, which is atmospheric.

FIG. 12 illustrates the presently preferred embodiment of valving member 200. It is adapted to be attached to threads on an inlet pipe 201 by internal threads 202 in a body 203. The body includes an inlet port 204 which receives water from the inlet pipe.

The body includes the elements of the adapters in the other embodiments, and may conveniently be formed in one piece. The threads are formed in a depending central neck 205 which is surrounded by a depending cylinder 206 that is radially spaced outwardly therefrom. Outlet ports 207 are formed axially through an internal web 208, which web terminates at a groove 209 formed around an internal upstanding neck 210.

Vacuum breaker ports 211 extend through the side wall of the body and are closed at their inside ends by an internal annular flexible vacuum breaker ring 212 which in its relaxed condition expands, hoop-like, out to close the vacuum breaker passages.

At the bottom of groove 209, there is one more hole 213 than there are outlet ports. This hole terminates short of the bottom of the web and is side-tapped by a fill tube 214, which will be connected to tube 20 in FIG. 1. Outlet ports 207 discharge downwardly inside the tube portion 215 of a trip member 216, which trip member includes a biasing weight 217 and an axially extending pin 218 which provides a contact surface on its depending end. A ring-shaped buoyant float 219 is frictionally engaged to the outside of tube portion 215 and may be slid along the tube portion to adjust the water height in the tank.

A shoulder 220 is formed in the inner wall of the body at an elevation just above the top of the vacuum breaker ring so that the ring will not be totally confined but instead is left with sufficient flexibility that when negative pressure is exerted on it, it can be moved inwardly away from the inner ends of the vacuum breaker passages to permit the entry of atmospheric pressure to the inside of the body and break any vacuum which might form therein. Within the body and resting on shoulder 220, there is a seat member 221 with a central port 222 which may be considered the valve outlet. Above port 222, there is a spheroidal retainer seat 223. A diaphragm 225 has a reinforcement sheet 226 of cotton cloth embedded between layers of neoprene rubber. The diaphragm has an outer shoulder 227 and a central cavity 228 with an upper substantially cylindrical interior wall 229, which blends into a lower substantially spheroidal wall 230 when the diaphragm is in its unflexed condition as shown in FIG. 12. The outer lower surface 231 of the diaphragm is spheroidal and lays against the spheroidal retainer seat 223 with its central portion overlaying the central port 222.

A hole 232 at the center of the diaphragm receives an insert 233 in the form of a grommet, which may be nylon or metal, and which has a port 234 therethrough. A scouring pin 235 is loosely fitted in port 234. The scouring pin has a lesser area than the port so that the port remains open to fluid flow at all times. The pin is headed on both ends so that it will not fall out.

A closure member 236 is mounted by threads 237 to matching threads inside the body. It has an outer depending cylindrical portion 238 which carries the threads and the inside of which passes over the outside of the shoulder 227 on the diaphragm and partly encloses the outer portion of seat member 221. It has an inner depending cylindrical portion 239, the outer surface of which fits against the cylindrical interior wall 229 of the diaphragm, and the inside surface of which forms a continuation of the cavity inside the diaphragm.

A boss 240 is placed integral with the closure member. It is inside it, and located on the axis of the valve at the top of the cavity. A coil spring 241 biases a rubber valve disc 242 toward the boss, tending to close a drain port 243 which extends through the top of the closure member and into the center of the boss. Notches 244 are cut in the periphery of the disc. A boss 245 rises axially on the top of the closure member and the drain port passes through it. A plurality of radial slits 246 provides for fluid passage out of the drain port even when the trip member rests upon it. The pin 248 is of sufficient length that when it is at its lowermost position, the disc is held off boss 240 to open drain port 243. The diameter of pin 218 is less than that of drain port 243.

Preferably, the flow area between scouring pin 235 and port 234 is less than that between pin 218 and the wall of drain port 243, so that the rate of opening and closing of the diaphragm is somewhat limited. The rate of motion is dependent on the rate at which fluid can flow into and out of cavity 228, so that some selective sizing of these flow areas is sometimes desirable.

Diaphragms 55, 128 and 225 are sometimes referred to as "shut-off" diaphragms. Their central regions which laterally overlap the respective ports are sometimes referred to as "sealing portions." That portion of the valve which is attached to the inlet pipe is sometimes called a "housing element."

The operation of the valve of FIGS. 1–7 will now be described. Assume that a flushing cycle is about to be started from the equilibrium condition shown in FIG. 1. In the equilibrium condition, the water level has risen to its desired height. The float was lifted by the water which raised contact surface 30 off of control pin 101. The poppet is moved by the bias spring and pressure inside the valving member to close drain port 94 (as in FIG. 2). The cavity between the diaphragm and the closure member is then exposed only to fluid pressure from port 65. This port, being in communication with the inlet, permits the pressure to build up above the diaphragm, tending to move it down. This will occur even when the pressure in the cavity is less than that in the inlet pipe, because the effective area of the upper surface of the diaphragm is greater than the cross-sectional area of the inlet. Therefore, the greater force developed on the upper side of the diaphragm moves the diaphragm down to close the inlet pipe and prevent flow from the inlet pipe to the outlet, even though the cavity pressure is somewhat less than inlet pressure. When these pressures are equal, the diaphragm is held down even more firmly.

To start the flushing cycle, handle 18 is turned, lifting ball 15 from seat 14, permitting the water in the tank to run out through outlet 13. The construction of such balls is well known and generally includes a bottom opening region to entrap air. The ball is buoyant while the water is flowing from the outlet. After the water has nearly all flowed out, the ball reseats, and the tank is closed so it can be refilled.

As soon as the level in the tank drops far enough that the contact surface depresses the control pin, the valving member will open the valve. The sole function of pin 101 is to cause the poppet to open drain port 94. For a valving member having an outer diameter of about ¾", an axial motion of the control pin of about 1/32" is enough to provide the control function. The control pin will ordinarily project by that amount or somewhat more above the top of the structure, and as soon as the water level has receded sufficiently, the trip member hangs up on top of the valving member, with the contact surface holding down the control pin. The trip member itself does not move very far in an up and down direction, for the reason that it hangs up on the device as just described when the water level recedes, and is lifted off the control pin (or at least lifted high enough that even though it might remain in contact with the control pin, the poppet seals the drain port), as soon as the water is at the desired level.

When the control pin depressed, the cavity is exposed to atmospheric pressure through the drain port via slots 49. The annular flow area around the control pin is greater than the annular area surrounding the scouring pin, so that water can run out of the cavity faster than it runs in. Thus, pressure can drop in the cavity enough to let the diaphragm rise, even though some water under pressure may be entering it from the inlet pipe.

When the pressure has dropped in the capsule so that the force on the bottom of the diaphragm is greater than the force on its upper surface, it lifts up slightly and fluid begins to flow from the inlet pipe out through the outlet. Then pressure drops still lower in the cavity, and the diaphragm is moved up still farther. With the diaphragm moved off the inlet port, water flows past the seat port, through slots 41, and down into the tank through the space between the inlet pipe and tube 28. Some of the water enters bowl-fill tube 20 and is dumped into the overflow pipe, from which it flows to refill the toilet bowl.

The rate of flow through the valve is less than that through the tank outlet, so that even though the valve is supplying water to the tank while water from the tank is discharging into the toilet, the tank can still be emptied. After the tank is emptied and the ball returns to its seat, the water rises in the tank until it lifts the float to lift contact surface 30 off the control pin, or at least raises the contact surface high enough that the control pin is able to let the poppet up to close the drain port. The bias spring and fluid pressure in the valving member then move the poppet upward to close drain port 94, and pressure again builds up in the cavity, after which the developed force inside the diaphragm tends to move the diaphragm down to close the inlet, and the valve is thereby shut off. The bias spring also aids the diaphragm in closing the inlet port.

Attention may now be given to certain features and advantages of the device of FIGS. 1–7. One of these features resides in groove 79 in the upper surface of the closure member. The diaphragm tends to move down quite quickly when the poppet closes the drain port. It has been found that valves of this type sometimes cause violent hammering in the line due to this sudden shut-off. This groove, being a flexible portion in the valving member, appears to provide a sufficient flexibility that the shock is cushioned, and the valve thereby closes without hammering or a thump. Groove 79 may at times be filled, or partially filled, with air which forms a resilient cushion. Occasionally, this groove may fill with water, in which event, when shock is taken up by a reduction of volume in this groove, excess water squirts into the outlet port by flowing between dome 92 and the under surface of the cup. When the closure member springs back after this action, some air or water ordinarily flows into the groove, but even if it does not, the structure is sufficiently strong to resume its normal shape even though there may be, for a short time, be a negative pressure in the groove. It is theorized that this groove acts to cushion shocks in either or both of the following two ways: (a) cushioning with entrapped elastic fluid; and (b) shear movement within the closure member along surfaces which lie between surface 93 and groove 79.

Hammering is further reduced by the conical surface of the cavity in the closure member. This particular shape, particularly in combination with the groove, appears to provide an optimum structure for absorbing sudden deceleration forces in the water stream.

The operation of the valve in FIG. 8 should be evident from the drawings, and from the foregoing description of the device of FIGS. 1–7, because its operation is substantially the same as the latter. In FIG. 8, the device is shown shut off because the trip member has been raised by its float to a position where the contact surface does not contact the control pin. Therefore, the inherent springiness of the control diaphragm lifts the control pin and closes the drain port. Then pressure builds up inside the cavity and forces the shut-off diaphragm down on the top of the inlet pipe to close the valve.

When water in the tank is lowered, such as by flushing a toilet, then the trip member drops down so that the contact surface strikes the control pin which pushes the control diaphragm off the lower end of the drain port, thereby venting the cavity and allowing the shut-off diaphragm to rise, whereupon, water flows from the inlet pipe through the valve outlet down between the inlet pipe and the spill tube into the tank. At the same time, some water is bypassed to the toilet valve through overflow tube 107. When the water in the tank rises sufficiently high, then the valve again shuts off because the control pin has moved off of the contact surface.

In the event that negative pressure (relative to atmospheric) occurs inside the spill tube, the vacuum will be broken by entry of air from inside the trip member through the vacuum breaker passages which will push the vacuum breaker ring away from its surrounding surfaces far enough to permit air to enter and break the suction. Slot 106 in the sidewall of the trip member serves to keep the inside of the trip member always at atmospheric pressure.

The device of FIG. 8 has the advantage of having no rubber fittings in locations where they might become extruded into narrow passages under pressure and also that it can easily be cast in relatively few plastic pieces.

The mode of operation of FIGS. 12–14 is substantially the same as that of the other embodiments. When the toilet is flushed, the water level in the tank drops and so does the level of float 219. Finally, the contact portion of pin 218 presses down on valve disc 242 to unseat it from the boss and liquid can then flow through notches 244 to drop the pressure inside the cavity and enable the differential pressure to lift the diaphragm off the inlet port 204 and permit fluid to flow. When the float finally rises high enough to remove the pin from contact with the disc, and the force of spring 241 returns the valve disc to an upper position where it seats on boss 240 and closes drain port 243. Then inlet pressure can flow into the cavity inside the diaphragm, the resulting unbalanced force on the diaphragm tending to move it down onto the inlet port and outlet port to close the same and thereby turn off the water.

In the event that a negative pressure develops so that there is a tendency to siphon back, then atmospheric pressure through vacuum breaker passages 211 will force the vacuum breaker ring off their inner ends, thereby venting the inside of the valve member and breaking the suction.

Still another advantage of this device over other devices of its type is obtained by providing the control pin separate from the scouring pin, whereby scouring action at the diaphragm port is continuous. The control pin dangles in port 65, and even a slight water current causes it to move around. Thus, even if the valve is not actuated often, the diaphragm port is kept open. Were a single pin used for both control and scouring, the pins would both be held quite still, and the diaphragm port could, in a system where the water is dirty, clog up. It does not when the pins are separate. Therefore, the provision of two separate pins has turned out to be of considerable advantage in keeping the valve in proper operation, particularly when the water is silty, and the valve seldom used.

Still another advantage of this device is provided by bias spring 98 which biases the device to a closed position by pressing against both the diaphragm and against the poppet. While these bodies will both tend to move to their respective closed positions under a suitable differential pressure, the bias spring provides an initial force which assures that such movement will always occur.

A relatively rigid insert in the diaphragm is preferably used because the natural flexure of the diaphragm in an upper direction tends to close the port therein, and it is desirable to keep it open at all times. Drain port 94 does not require an insert, although one could be provided if desired, because the pressure tends to open it, and there is no particular tendency for it to clog up.

Still a further advantage of this device resides in the trip member in which a ring-shaped float is frictionally engaged with the outer surface of tube 28 so that the water level in the tank is easily adjustable merely by shifting the float along the tube. The float will always float atop the water. Changing the elevation of the contact surfaces relative to the float changes the water level at which the contact surface enables the drain port to be closed.

This invention provides a simple, reliable flush valve with only two parts which undergo any significant amount of movement, and only one of which is subject to wear. The trip members are removable by simply lifting them off, thereby giving easy access to the working parts.

It has been found that the illustrated valves are adaptable to the refilling of tanks of a given capacity much faster than other valves of the same general class. They are simple, rugged, easy to construct, and inexpensive in design.

Repair of these valves is easily performed by lifting off the trip member and replacing the valving member as a unit.

This invention is not to be limited by the embodiments shown in the drawings and described in the description, which are given by way of example and not of limitation, but only in accordance with the scope of the appended claims.

What is claimed is:

1. A flush valve for establishing a liquid level in a tank, comprising: an inlet adapted to receive liquid under pressure; an outlet spaced from the inlet; a float-actuated trip member adapted to rise and fall with the liquid level; a valving member for controlling flow of liquid from inlet to outlet, said valving member comprising a housing attachable to the inlet, said housing forming and enclosing a cavity; a diaphragm mounted to said housing within the cavity, and facing the inlet, one side of the diaphragm being adapted to contact and close the inlet in one position, and to shift away from it and permit fluid flow from inlet to outlet in another position, the area of the diaphragm on the side opposite the inlet being greater than the inlet area, a port through the diaphragm continuously fluidly interconnecting the inlet and the opposite side of the diaphragm, a drain port through said housing and opening into the cavity, a valving element adapted to be shifted toward and away from the drain port to close and open the drain port, there being a flow channel past the valving element at least when the valving element is shifted away from the drain port, actuating means actuated by the trip member for moving said valving element away from the drain port; an annular wall in said housing in the outlet; an annular flexible vacuum breaker ring within and in sealing contact with said wall; a vacuum breaker passage through the housing terminating at said wall so as to be closed by the said ring, positive pressure in the vacuum breaker passage forcing the ring to open the vacuum breaker passage to admit pressure to the outlet and break the vacuum in said housing, whereby opening of the drain port lowers pressure in the cavity to remove the diaphragm from the inlet and open the valve to flow, closing of the drain port enabling inlet pressure to build up in the cavity, and move the diaphragm to close the inlet.

2. A flush valve according to claim 1 in which the valving element comprises a control diaphragm having an imperforate portion adjacent to the drain port and a perforation spaced therefrom.

3. A flush valve according to claim 1 in which the housing comprises a body threaded to the inlet, a seat member within and abutting the body, a seat on the seat member for supporting the outer portion of the diaphragm, a central opening in the seat member exposing the diaphragm to the inlet, a scouring pin in the port through the diaphragm, the valving member being a disc, and the flow channels comprising openings therethrough, and in which the actuating means comprises a pin adapted to pass through the drain port with a clearance for fluid flow.

4. A flush valve according to claim 1 in which the trip member comprises a tube surrounding the valving member, and in which a ring-shaped float is frictionally engaged to the tube, whereby it may be slid along the tube to adjust the water level established by the flush valve.

5. A flush valve according to claim 3 in which a coil spring is placed in the cavity in compressive opposition between the valve disc and the diaphragm to bias the disc toward the boss and the diaphragm toward the inlet.

6. A flush valve according to claim 3 in which the trip member comprises a tube surrounding the valving member, and in which a ring-shaped float is frictionally engaged to the tube, whereby it may be slid along the tube to adjust the water level established by the flush valve.

7. A flush valve according to claim 1 in which a boss is formed on the housing inside the cavity through which the drain port opens into the cavity.

8. A flush valve according to claim 7 in which the housing comprises a body threaded to the inlet, a seat member within and abutting the body, a seat on the seat member for supporting the outer portion of the diaphragm, a central opening in the seat member exposing the diaphragm to the inlet, a scouring pin in the port through the diaphragm, the valving member being a disc, and the flow channels comprising openings therethrough, and in which the actuating means comprises a pin adapted to pass through the drain port with a clearance for fluid flow.

9. A flush valve according to claim 8 in which the trip member comprises a tube surrounding the valving member, and in which a ring-shaped float is frictionally engaged to the tube, whereby it may be slid along the tube to adjust the water level established by the flush valve.

10. A flush valve according to claim 7 in which the valving element comprises a control diaphragm having an imperforate portion adjacent to the drain port and a perforation spaced therefrom.

(Other references on following page)

References Cited in the file of this patent

UNITED STATES PATENTS

| | | |
|---|---|---|
| 1,690,057 | Coleman | Oct. 30, 1928 |
| 2,143,204 | McCormack | Jan. 10, 1939 |
| 2,524,699 | Friedl | Oct. 3, 1950 |
| 2,588,242 | Hunter | Mar. 4, 1952 |
| 2,670,007 | Adams | Feb. 23, 1954 |
| 2,815,921 | Bigelow | Dec. 10, 1957 |
| 2,827,072 | Lund | Mar. 18, 1958 |
| 2,911,000 | Doyle | Nov. 3, 1959 |

FOREIGN PATENTS

| | | |
|---|---|---|
| 135,372 | France | Mar. 4, 1880 |
| 102,794 | Sweden | Oct. 14, 1941 |
| 153,027 | Australia | Aug. 31, 1953 |
| 85,711 | Norway | June 20, 1955 |